United States Patent

Nonaka et al.

[11] Patent Number: 5,840,466
[45] Date of Patent: Nov. 24, 1998

[54] OPTICAL RECORDING MEDIA AND THEIR PRODUCTION METHODS

[75] Inventors: Toshihisa Nonaka, Otsu; Gentaro Ohbayashi, Kusatsu; Kusato Hirota, Otsu, all of Japan

[73] Assignee: Toray Industries, Inc., Tokyo, Japan

[21] Appl. No.: 553,640

[22] PCT Filed: Mar. 27, 1995

[86] PCT No.: PCT/JP95/00564

§ 371 Date: Nov. 22, 1995

§ 102(e) Date: Nov. 22, 1995

[87] PCT Pub. No.: WO95/26549

PCT Pub. Date: Oct. 5, 1995

[30] Foreign Application Priority Data

Mar. 25, 1994 [JP] Japan ................................. 6-055990
Apr. 28, 1994 [JP] Japan ................................. 6-091972

[51] Int. Cl.$^6$ ........................................................ G11B 7/24
[52] U.S. Cl. .................... 430/270.13; 430/275.1; 430/273.1; 430/945; 458/64.5; 458/64.6; 369/283; 369/288
[58] Field of Search ........................... 430/273.15, 271.1, 430/273.1, 275.3, 945; 204/192.15, 192.16, 192.26, 192.28; 428/64.1, 64.2, 64.6, 64.4, 64.3, 9.3; 369/283, 288; 346/135.1

[56] References Cited

U.S. PATENT DOCUMENTS

| | | | |
|---|---|---|---|
| 4,637,976 | 1/1987 | Terao et al. | 430/945 |
| 5,234,737 | 8/1993 | Ueno et al. | 428/64 |
| 5,346,740 | 9/1994 | Ohno et al. | 428/64 |
| 5,362,538 | 11/1994 | Ohbayashi et al. | 430/945 |
| 5,378,527 | 1/1995 | Nakanishi et al. | 428/216 |
| 5,395,669 | 3/1995 | Kawahara et al. | 430/945 |

FOREIGN PATENT DOCUMENTS

| | | |
|---|---|---|
| 0 541 376 A1 | 5/1990 | European Pat. Off. . |
| 0 630 007 A1 | 12/1994 | European Pat. Off. . |
| 61-131254 | 6/1986 | Japan ................................. 369/275.2 |
| 05-159360 | 6/1993 | Japan . |
| 6-60419 | 3/1994 | Japan . |
| 6-150368 | 5/1994 | Japan . |
| 6-150375 | 5/1994 | Japan . |

OTHER PUBLICATIONS

CRC Handbook of Chemistry and Physics, 63rd ed., pp. F–76, © 1982.

Ohta et al., "Phase Change Disk Media Having Rapid Coling Structure", vol. 28, Suppl. 28–3, pp. 123–128 (© 1898).

*Primary Examiner*—Martin Angebrannt
*Attorney, Agent, or Firm*—Morrison & Foerster

[57] ABSTRACT

An optical recording medium, wherein a recording layer is formed on a substrate to which a light beam is applied to record, erase, and read data with said recording and erasing of data being carried out by means of phase changes between amorphous and crystalline, and which recording medium has a laminated structure made up of a transparent substrate on which at least a first dielectric layer, recording layer, second dielectric layer, and reflecting layer are formed in this order; and the second dielectric layer not being transparent.

Said optical recording media permit low-power recording and erasing, remain stable after repeated recording and erasing, and hardly suffer deterioration in performance or formation of defects. They are high in resistance to moist heat and oxidation and long in service life.

7 Claims, No Drawings

OPTICAL RECORDING MEDIA AND THEIR PRODUCTION METHODS

FIELD OF THE INVENTION

The present invention relates to a optical recording medium wherein the recording, erasing, and reading of data are carried out applying a light beam, and production methods thereof. The invention particularly relates to phase-change type rewritable optical recording medium, such as optical disks, wherein recorded data can be erased or overwritten and wherein data can be recorded with high speed and high density, and production methods thereof.

BACKGROUND OF THE INVENTION

Techniques for conventional phase-change type rewritable optical recording media are as follows.

Those optical recording media have a recording layer consisting mainly of telluride, which, for recording, is partially melted by applying a converged pulsed laser beam to the crystalline-state recording layer for a short period of time. The melted portion is rapidly cooled and solidified due to thermal diffusion, resulting in the formation of an amorphous record mark. With an optical reflectivity lower than that for the crystalline state, the record mark can be read to produce a signal.

To erase the data, a laser beam is applied to the record mark to heat the recording layer up to a temperature that is lower than the melting point but higher than the crystallization temperature so that the amorphous record mark portion is crystallized to allow that portion of the layer to recover its unrecorded state.

Known materials for the recording layer of such phase-change type rewritable optical recording media include some alloys such as $Ge_2Sb_2Te_5$ (N. Yamada et al., Proc. Int. Symp. on Optical Memory 1987 pp. 61–66).

These optical recording media with layers recording layer consisting of a Te alloy has a high crystallization rate to allow high-speed overwriting to be performed by varying the power of the beam which has a circular cross-section. In the optical recording media with such a recording layer, a heat-resistant transparent dielectric layer is provided on both sides of the recording layer to prevent deformation and opening formation from occurring on the recording layer during the recording process. In addition, there are other known techniques which use a reflecting metal layer, of Al etc., provided over the dielectric layer so that some optical interference is caused to improve the signal contrast during reading and so that the recording layer is cooled efficiently to facilitate the formation of amorphous record marks and to improve the erasing characteristics and repeated use characteristics. In particular, a structure where the recording layer and the dielectric layer between the recording layer and the reflection layer are about 20 nm or less in thickness (rapid cooling structure) is small in the deterioration of recording characteristics due to repeated erasing and writing and wide in erasing power margin as compared to ones with a dielectric layer with an about 200 nm or more thickness (moderate cooling structure). (T. Ohta et al., SPIE Proc. Vol. 1316 (1990) pp.367–373).

These conventional phase-change type rewritable optical recording media of a rapid cooling structure have such problems as follows:

The conventional disk structure requires a large-power laser beam to produce record marks. Thus a disk drive for recording and reading has to be provided with laser equipment that produces a high-power beam, leading to large costs.

SUMMARY OF THE INVENTION

An object of the present invention is to solve said problems with conventional optical recording media and to provide high-sensitivity optical recording media.

Another object of the invention is to provide optical recording media that are high in stability for long-term storage and are long in service life.

Another object of the invention is to provide optical recording media that are high in resistance to repeated use.

Another object of the invention is to provide methods that can produce said optical recording media easily.

These objects are achieved by the following features of the invention. The invention provides optical recording media, wherein a recording layer is formed on a substrate to which a light beam is applied to record, erase, and read data with said recording and erasing of data being carried out by means of phase changes between amorphous and crystalline, and which recording layer comprises a laminate member consisting at least of a first dielectric layer, recording layer, second dielectric layer, and reflecting layer that are formed in this order over a transparent substrate, with the second dielectric layer being not transparent, and also provides optical recording media, wherein a recording layer is formed on a substrate to which a light beam is applied to record and erase data by means of phase changes between amorphous and crystalline states of the recording layer. The recording layer comprises a laminate member consisting at least of a first dielectric layer, recording layer, second dielectric layer, and reflecting layer that are formed in this order over a transparent substrate, with the second dielectric layer having a thickness of 30 nm or more and 60 nm or less. The invention further provides methods for producing said optical recording media comprising a recording layer formed on a substrate to which a light beam is applied to record and erase data by means of phase changes between amorphous and crystalline states of the recording layer, wherein an integral sputtering target consisting of ZnS, $SiO_2$, and C is used to produce a mixture film of ZnS and $SiO_2$.

There is a known method that uses a dielectric layer that consists of chalcogen and carbon with the aim of not only imparting required properties including transparency but also reduce the internal stress in the dielectric layer (European Patent No. 541376 Specification). However, no descriptions are given about methods to use a dielectric layer that is not transparent.

DETAILED DESCRIPTION OF THE INVENTION

The first and the second dielectric layer 2 of the invention serve to protect the substrate and the recording layer by, for example, preventing the substrate and the recording layer from deterioration in recording characteristics due to thermal deformation during the recording process and also serve to improve the signal's contrast during the reading process by means of optical interference.

The thickness of the first dielectric layer, $d_1$, is generally 50 nm or more and 400 nm or less to prevent the layer from being peeled off the substrate or the recording layer and to prevent defects such as cracks. Preferably, the thickness should meet the equation $0.25\ \lambda/n \leq d_1 \leq 0.70\ \lambda/n$, where $\lambda$ denotes the wavelength of the light used for recording and reading, in order to increase the carrier-to-noise (C/N) ratio by enhancing the contrast of recorded and read signals.

To permit low-power recording and erasing, it is important for the second dielectric layer to be non-transparent and to be 30 nm or more and 60 nm or less.

The expression "non-transparent" here refers not only to being opaque but also to being translucent. For the invention, the extinction coefficient, k, of the second dielectric layer should be greater than zero. Low-power recording and erasing may not be achieved if k is zero. To achieve both low-power recording, and a high C/N ratio based on enhanced contrast of recorded and read signals, k should meet the equation $0.01 \leq k \leq 1.0$, preferably $0.01 \leq k \leq 0.03$.

The above-mentioned conventional phase-change type rewritable optical recording media have a second dielectric layer with a thickness of 20 nm and require a laser power of 16 mW or more. Compared to this, the present invention uses a non-transparent second dielectric layer so that the layer can absorb light to enhance the sensitivity, allowing equipment of the same construction to perform high-quality recording with laser of a small power of 15 mW or less.

To permit low-power recording and erasing, it is important for the second dielectric layer to have a thickness of between 30 nm or less and 60 nm or less. To achieve both low-power recording, and a high C/N ratio based on enhanced contrast of recorded and read signals, its thickness should be 35 nm or more and 50 nm or less. In this invention, a second dielectric layer with a thickness of 30 nm or more permits high-quality recording with a laser power of 14 mW or less. If the second dielectric layer is more than 60 nm thick, repeated recording and erasing may cause deterioration in performance and reduce the contrast of recorded and read signals which leads to a decreased C/N ratio.

The film materials available for the first dielectric layer include such inorganic material as ZnS, $SiO_2$, silicon nitride, and aluminum oxide. In particular, film materials of ZnS, oxides of such metals as Si, Ge, Al, Ti, Zr, and Ta, nitrides of Si, Al, etc., carbides of Ti, Zr, Hf, etc., and mixtures of these compounds are useful because they are highly resistant to temperature. It is recommended to add carbon or a fluoride such as $MgF_2$ to them to reduce the residual stress in the film. In particular, a mixture film of ZnS and $SiO_2$ and a mixture film of ZnS, $SiO_2$ and carbon are useful because they are more unlikely to suffer a decrease in recording sensitivity, C/N ratio or erasing rate from repeated recording and erasing. A mixture film of ZnS, $SiO_2$ and carbon is particularly useful.

Material for the second dielectric layer should be, for example, a mixture of a compound with a k of 0.1 or more with one of such film materials with k of less than 0.1 as inorganic film materials including ZnS, $SiO_2$, silicon nitride, and aluminum oxide, particularly ZnS film, oxides of metals including Si, Ge, Al, Ti, Zr, and Ta, nitrides of Si, Al, etc., carbides of Ti, Zr, Hf, etc., and mixtures of these compounds. The useful materials with k of 0.1 or more include single substances such as C, Ge, Al, Ti, Zr, Ta, Si, Zn, Hf, Au, Ag, Pt, Cu, Cr, W, Pd, Mo, Nb, Fe, Co, Ni, Ga, Cd, Rh, Y, La, Ce, Pr, Nd, Sm, Eu, Gd, Tb, Dy, Ho, Er, Tm, Yb, and Lu, and compounds of oxides, sulfides, etc., with k of 0.5 or more. Among others, a dielectric layer should be a film mixture consisting at least of ZnS, $SiO_2$, and carbon. Further, it is desirable that the molar ratio of ZnS and $SiO_2$ in the second dielectric layer should meet the equation $ZnS/SiO_2 = 85/15 - 65/35$ and that the molar ratio of $(ZnS+SiO_2)$ and C should meet the equation $(ZnS+SiO_2)/C = 95/5 - 80/20$.

To maximize the high recording sensitivity, to permit one-beam overwriting, and to achieve good erasing characteristics with a large erase ratio, the main part of an optical recording medium should be constituted as follows.

The materials useful for the reflecting layer include metals that reflect light such as Al, Au, etc., alloys consisting of them with such additive elements as Ti, Cr, Hf, etc., and such metals as Al and Au containing such metallic compounds as nitrides, oxides and chalcogenides of Al, Si, etc. Such metals as Al and Au and alloys consisting of them as main component are desirable because high reflectance and high heat conductivity can be achieved. Such alloys include Al alloys containing one or more elements selected from the group of Mg, Cu, Pd, Ti, Cr. Hf, Ta, Nb, and Mn up to a total content of 1 atomic % or more and 5 atomic % or less, and Au alloys containing one or more elements selected from the group of Cr, Ag, Cu, Pd, Pt, and Ni, and Mn up to a total content of 1 atomic % or more and 20 atomic % or less. Alloys containing Al as main component are desirable because material costs can be minimized. Particularly desirable ones with high corrosion resistance include Al alloys containing one or more metals selected from the group of Ti, Cr, Ta, Hf, Zr, Mn, and Pd. up to a total content of 0.5 atomic % or more and 5 atomic % or less. Among others, such alloys containing Al as main component as Al—Hf—Pd alloys, Al—Hf alloys, Al—Ti alloys, Al—Ti—Hf alloys, Al—Cr alloys, Al—Ta alloys, and Al—Si—Mn alloys are very useful as material for the reflecting layer because of being highly corrosion-resistant and free from the formation of hillock etc.

An alloy that contains at least the three elements of Ge, Sb, and Te should be used as material for the recording layer, and the composition of the recording layer should be in the range described by the following equations:

$$M_z(Sb_xTe_{1-x})_{1-y-z}(Ge_{0.5}Te_{0.5})_y$$

$$0.35 \leq x \leq 0.5$$

$$0.2 \leq y \leq 0.5$$

$$0.0005 \leq z \leq 0.01$$

In these equations, M denotes at least one metal selected from the group of palladium, niobium, platinum, silver, gold, and cobalt, and Sb, Te, and Ge denote niobium, tellurium, and germanium, respectively. Further, x, y, z, and numbers show the number of the relevant element (number of moles of the element). In particular, at least either palladium or niobium should be contained to enhance the above-mentioned effects.

For the present invention, the thickness of the layers should be fixed as follows:

$$0.25 \, \lambda/n \leq d_1 \leq 0.70 \, \lambda/n$$

$$10 \leq d_r \leq 40 \, (nm)$$

$$10 \leq d_2 \leq 60 \, (nm)$$

$$40 \leq d_f \leq 200$$

$$2 \leq n_1 \leq 2.5$$

$$2 \leq n_2 \leq 2.5$$

where $\lambda$ denotes the wavelength of the light used for recording and reading, $d_1$ the thickness of the first dielectric layer, $n_1$ its refractive index (real part), $d_r$ the thickness of the recording layer, $d_2$ the thickness of the second dielectric layer, $n_2$ its refractive index (real part), and $d_f$ the thickness of the reflecting layer.

The useful materials for the substrate include various types of transparent resin and transparent glass. To eliminate the effect of dust and flaws on the substrate, it is desirable to use a transparent substrate and a convergent laser beam that is applied from the substrate side to perform recording. Such transparent substrate materials include glass polycarbonate, polymethyl methacrylate, polyolefin resin, epoxy resin, and polyimide. Polycarbonate resin and amorphous polyolefin resin are particularly useful because they have low optical birefringence, are low moisture absorption, and are easy to mold.

There are no limitations on the thickness of the substrate, but a thickness of 0.01–5 mm is practical. If it is less than 0.01 mm, recording may be affected by dust even when a convergent beam is applied from the substrate side for recording. If it is more than 5 mm, it becomes difficult to use an objective lens with a large numerical aperture, and a large beam spot size has to be used, making it difficult to increase the recording density. The substrate may be flexible or rigid. A flexible substrate may be in the form of tape, a sheet, or a card. A rigid substrate may be in the form of a car or disk. Two such substrates, provided with a recording layer etc., may be combined into an air sandwich structure, air incident structure, or a close-contact laminate structure.

The light source used for recording on the optical recording media of the invention should be a high-intensity one such as laser or stroboscope. Semiconductor laser is particularly useful because of its small source size, small power consumption, and easy modulation.

To record data, laser beam pulses etc. are applied to a crystalline recording layer to produce amorphous record marks. Contrary to this, crystalline record marks may be produced on an amorphous layer. To erase the data, a laser beam is applied to transform the amorphous record marks into the crystalline state or transform the crystalline record marks into the amorphous state. A design where recording is carried out by producing amorphous marks which are crystallized for erasing is preferable because recording can be performed more rapidly and because the recording layer is less unlikely to suffer distortion.

Because of the short time required for rewriting, it is desirable to use the one-beam overwriting method where high- and low-intensity light is used for producing and erasing record marks, respectively, to allow rewriting to be achieved by applying light only once.

Methods for producing optical recording media of the invention are described below.

Some known methods for producing thin film in a vacuum, including vacuum deposition, ion plating, and sputtering, can be used to form a reflecting layer, recording layer, etc., on a substrate. Sputtering is particularly useful because the composition and thickness of the film can be controlled easily. To produce a mixture film of ZnS, $SiO_2$, and C, the use of an integral sputtering target consisting of ZnS, $SiO_2$, and C is more desirable than the use of separate targets of ZnS, $SiO_2$, and C because it is easier.

The thickness of the recording layer etc. to be formed can be easily controlled by monitoring the build-up with a quartz-oscillator film thickness gauge etc.

The formation of the recording layer etc. may be performed with the substrate being fixed, conveyed, or rotated. The substrate preferably rotate on its axis, more preferably while revolving around an axis outside the subject, to achieve a uniform film thickness.

Unless harmful to the effects of the invention, a dielectric layer of ZnS, $SiO_2$, etc., and a protective resin layer of ultraviolet-curing resin etc. may be provided as required, after the formation of the reflecting layer etc., in order to prevent flaws and deformation. Two substrates, facing each other, may be adhered with an adhesive agent after the formation of the reflecting layer etc. or after the formation of such a protective resin layer as describe above.

Prior to actual recording of data, the recording layer should be crystallized by applying light from laser equipment, xenon flash lamp, etc.

To further illustrate this invention, the following examples are given.

Methods for analysis and measurement

An ICP emission spectrometer (Seiko Electronics Inc.) is used to determine the composition of the reflecting layer and recording layer. The carrier-to-noise ratio and erase ratio (difference in intensity of carrier signals read after recording and after erasing) are measured with a spectrum analyzer.

Changes in the thickness of the recording layer, dielectric layer, and reflecting layer during their formation are monitored with a quartz-oscillator film thickness gauge. The thickness of each layer is determined from observations of their cross sections made with a scanning or transmission electron microscope.

EXAMPLE 1

A recording layer, dielectric layer, and reflecting layer are formed by high-frequency magnetron sputtering over a polycarbonate substrate 1.2 mm in thickness, 13 cm in diameter provided with a spiral groove of a 1.2 $\mu$m pitch. The substrate is rotated at 30 rpm during the sputtering process.

To do this, sputtering of ZnS containing 20 mol. % $SiO_2$ is performed in a gas atmosphere to form on the substrate a first dielectric layer with a film thickness of 160 nm and a refractive index of 2.2. Subsequently, a alloy target consisting of Pd, Nb, Ge, Sb, and Te is sputtered to produce a 19 nm thick recording layer of $Nb_{0.004}Pd_{0.001}Ge_{0.175}Sb_{0.25}Te_{0.56}$. Then, sputtering of C (k-value of C is 0.9) and sputtering of ZnS containing 20 mol. % $SiO_2$ are carried out simultaneously to form a 38 nm thick second dielectric layer with a molar ZnS to C ratio of 8 to 1 (molar $ZnS/SiO_2$ ratio=8/2, molar $(ZnS+SiO_2)/C$ ratio=8/1), followed by the production of an 80 nm thick reflecting layer of a $Pd_{0.001} Hf_{0.02}Al_{0.979}$ alloy.

After removing the disk out of the vacuum container, the reflecting layer is spin-coated with ultraviolet-curing acrylic resin (Dainippon Ink & Chemicals, Inc., SD-101), and it is cured by applying ultraviolet light to form a 10 $\mu$m thick resin layer, thus obtaining an optical recording medium of the present invention.

A semiconductor laser beam with a wave length of 820 nm is applied to this optical recording medium, and the whole area of the recording layer of the disk is crystallized for initialization.

While rotating the disk at a linear speed of 12 m/sec, data are repeatedly overwritten 100 times with a semiconductor laser beam modulated to a peak power of 8–17 mW and bottom power of 4–9 mW at a frequency of 8.65 MHz (duty 37%) by using an optical head that is 0.5 in the numerical aperture of the objective lens and 780 nm in the wave length of the semiconductor laser beams. Then, while applying a semiconductor beam with a read power of 1.0 mW, the C/N ratio is determined under the condition of 30 kHz band width. Furthermore, while one-beam overwriting is performed by exposing this portion to a 3.24 MHz (duty 19%) semiconductor laser beam modulated as described above, measurements are made of the erase ratio for the record marks formed previously with a 8.65 MHz as well as the jitter at the rear edge of read signals from the record marks.

A C/N ratio of 50 dB, which is within a practically useful range, is obtained at a peak power of 10 mW and an erase ratio of 20 dB, which is also within a practically useful range, is achieved at a minimum power of 4–7 mW.

In addition, one-beam overwriting is repeated 10,000 times under the conditions of a peak power of 12 mW, minimum power of 6 mW, and frequency of 8.65 MHz, followed by the same measuring process. The changes in the erase ratio are within 2 dB, showing no significant deterioration. The increase in the jitter is not significant, either. The recorded data are read after allowing the optical recording medium to stand at a temperature of 80° C. and relative humidity of 80% for 1,000 hours. The changes in the C/N ratio are within a very small range of 2 dB. The C/N ratio and erase ratio are measured after recording and erasing data again, but no significant changes are seen as in the above case.

In a part of the optical recording medium, the second dielectric layer is peeled off the recording layer at their interface, and the k-value of the second dielectric layer is measured with a spectral ellipsometer, showing that it is 0.05.

Cross section of part of the optical recording medium is then observed by transmission microscopy. Results show that the thickness of the first dielectric layer, recording layer, second dielectric layer, and reflecting layer is in the range set up above.

EXAMPLE 2

A disk is produced in the same way as in Example 1 except that sputtering of C and sputtering of ZnS containing 20 mol. % $SiO_2$ are carried out simultaneously to form a first dielectric layer with a molar ratio of ZnS, $SiO_2$, and C being 8:2:1.2. Recording characteristics are observed in a way similar to Example 1. Results show that a C/N ratio of 50 dB or more, which is practically useful, is obtained at a peak power of 10 mW or more and an erase ratio of 20 dB or more, which is also practically useful, is achieved at a minimum power of 4–7 mW.

In addition, one-beam overwriting is repeated 10,000 times under the conditions of a peak power of 12 mW, minimum power of 6 mW, and frequency of 8.65 MHz, followed by the same measuring process. The changes in the erase ratio are within 2 dB, showing no significant deterioration. The increase in the jitter is not significant, either.

The recorded data are read after allowing the optical recording medium to stand at a temperature of 80° C. and relative humidity of 80% for 1,000 hours. The changes in the C/N ratio are within a very small range of 2 dB. The C/N ratio and erase ratio are measured after recording and erasing data again, but no significant changes are seen as in the above case. Thus, almost identical good recording and erasing characteristics are achieved in both cases.

Measurement made in the same way as in Example 1 shows that k is 0.06.

EXAMPLE 3

A disk is produced in the same way as in Example 1 except that sputtering of C and sputtering of ZnS containing 20 mol. % $SiO_2$ are carried out simultaneously to form a first dielectric layer with a molar ratio of ZnS, $SiO_2$, and C being 8:2:2.5. Recording characteristics are observed in a way similar to Example 1. Results show that a C/N ratio of 50 dB or more, which is practically useful, is obtained at a peak power of 9.2 mW or more and an erase ratio of 20 dB or more, which is also practically useful, is achieved at a bottom power of 4–7 mW. In addition, one-beam overwriting is repeated 10,000 times under the conditions of a peak power of 11 mW, minimum power of 5.6 mW, and frequency of 8.65 MHz, followed by the same measuring process. The changes in the erase ratio are within 2 dB, showing no significant deterioration. The increase in the jitter is not significant, either.

The recorded data are read after allowing the optical recording medium to stand at a temperature of 80° C. and relative humidity of 80% for 1,000 hours. The changes in the C/N ratio are within a very small range of 2 dB. The C/N ratio and erase ratio are measured after recording and erasing data again, but no significant changes are seen as in the above case. Thus, almost identical good recording characteristics are achieved in both cases.

Measurement made in the same way as in Example 1 shows that k is 0.25.

EXAMPLE 4

A disk is produced in the same way as in Example 1 except that the thickness of the second dielectric layer is 20 nm. Recording characteristics are observed in a way similar to Example 1. Results show that a C/N ratio of 50 dB or more, which is practically useful, is obtained at a peak power of 14 mW or more and an erase ratio of 20 dB or more, which is also practically useful, is achieved at a bottom power of 6–9 mW.

In addition, one-beam overwriting is repeated 10,000 times under the conditions of a peak power of 16 mW, minimum power of 8 mW, and frequency of 8.65 MHz, followed by the same measuring process. The changes in the erase ratio are within 2 dB, showing no significant deterioration. The increase in the jitter is not significant, either.

The recorded data are read after allowing the optical recording medium to stand at a temperature of 80° C. and relative humidity of 80% for 1,000 hours. The changes in the C/N ratio are within a very small range of 2 dB. The C/N ratio and erase ratio are measured after recording and erasing data again, but no significant changes are seen as in the above case. Thus, almost identical good recording and erasing characteristics are achieved in both cases.

EXAMPLE 5

A disk is produced in the same way as in Example 1 except that an integral target with a molar $ZnS:SiO_2:C$ ratio of 72:18:10 is used instead of performing simultaneous sputtering of C and ZnS containing 20 mol. % $SiO_2$. Recording characteristics are observed in a way similar to Example 1. Results show that a C/N ratio of 50 dB or more, which is practically useful, is obtained at a peak power of 10 mW or more and an erase ratio of 20 dB or more, which is also practically useful, is achieved at a minimum power of 4–7 mW.

In addition, one-beam overwriting is repeated 10,000 times under the conditions of a peak power of 12 mW, minimum power of 6 mW, and frequency of 8.65 MHz, followed by the same measuring process. The changes in the erase ratio are within 2 dB, showing no significant deterioration. The increase in the jitter is not significant, either.

The recorded data are read after allowing the optical recording medium to stand at a temperature of 80° C. and relative humidity of 80% for 1,000 hours. The changes in the C/N ratio are within a very small range of 2 dB. The C/N ratio and erase ratio are measured after recording and erasing data again, but no significant changes are seen as in the above case. Thus, almost identical good recording and erasing characteristics are achieved in both cases.

Measurement made in the same way as in Example 1 shows that k is 0.06.

COMPARATIVE EXAMPLE 1

A disk of the conventional rapid cooling structure is produced in the same way as in Example 1 except that the second dielectric layer of the optical recording medium is formed by sputtering ZnS containing 20 mol. % $SiO_2$ up to a thickness of 20 nm and that the reflection layer is 150 nm thick.

Measurements are made in a way similar to Example 1. Results show that the C/N ratio does not reach 50 dB when the peak power is less than 15 mW, and a C/N ratio of 50 dB or more is obtained only at a peak power of 16 mW or more. An erase ratio of 20 dB or more is achieved only at a minimum power of 7–10 mW, indicating that the optical recording medium is less sensitive than those produces in the above examples.

Measurement made in the same way as in Example 1 shows that k is 0.

The optical recording media of the present invention permit low-power recording and erasing, remain stable after repeated recording and erasing, and hardly suffer deterioration in performance or formation of defects. In addition, they are high in resistance to moist heat and oxidation and long in service life. Said optical recording media can be produced easily by using the methods of the present invention.

We claim:

1. An optical recording medium, comprising a recording layer formed on a substrate to which a light beam is applied to record, erase and read data, said recording and erasing of data being carried out by means of phase change between amorphous and crystalline states of the recording layer, said recording medium having a laminated structure comprising a transparent substrate on which a first dielectric layer comprising a mixture of ZnS and $SiO_2$, a recording layer, a second non-transparent dielectric layer comprising ZnS, $SiO_2$ and C, and a reflective layer are formed in order, wherein the second dielectric layer has an extinction coefficient k which meets the equation $0.01 \leq k \leq 1.0$, wherein the molar ratio of ZnS and $SiO_2$ in the second dielectric layer meets the equation $ZnS/SiO_2=85/15-65/35$ and the molar ratio of $(ZnS+SiO_2)$ and C meets the equation $(ZnS+SiO_2)/C=95/5-80/20$.

2. An optical recording medium as specified in claim 1 wherein k meets the equation $0.01 \leq k \leq 0.3$.

3. An optical recording medium as specified in claim 1 wherein the thickness of the first dielectric layer, d1, meets the equation 50 nm $\leq d_1 \leq$ 400 nm.

4. An optical recording medium as specified in claim 1, wherein the thickness of the first dielectric layer, $d_1$, meets the equation $0.25\lambda/n_1 \leq d \leq 0.70\lambda/n_1$, where $\lambda$ denotes the wavelength used for recording and reading and $n_1$ is the index of refraction of the first dielectric layer.

5. An optical recording medium as specified in claim 2, wherein the thickness of the second dielectric layer meets the equation 35 nm $\leq d2 \leq$ 50 nm.

6. An optical recording medium as specified in claim 1 wherein the recording layer is made up of an alloy that comprises the three elements of Ge, Sb, and Te.

7. An optical recording medium, comprising a recording layer formed on a substrate to which a light beam is applied to record, erase and read data, said recording and erasing of data being carried out by means of phase changes between amorphous and crystalline states of the recording layer, said recording medium having a laminated structure comprising a transparent substrate on which a first dielectric layer, a recording layer, a second dielectric layer, and a reflecting layer are formed in order;

wherein the second dielectric layer consists essentially of a substance having an extinction coefficient k of 0.1 or more, wherein the molar ratio of ZnS and $SiO_2$ in the second dielectric layer meets the equation $ZnS/SiO_2=85/15-65/35$ and the molar ratio of $(ZnS+SiO_2)$ and C meets the equation $(ZnS+SiO_2)/C=95/5-80/20$.

* * * * *